United States Patent [19]

Bruning

[11] 4,445,713
[45] May 1, 1984

[54] BULKHEAD-FLUID-LINE CONNECTOR

[75] Inventor: E. Eugene Bruning, Normal, Ill.

[73] Assignee: Caterpillar Tractor Co., Peoria, Ill.

[21] Appl. No.: 399,626

[22] Filed: Jul. 19, 1982

[51] Int. Cl.³ .......................... F02B 77/00; F16L 5/02
[52] U.S. Cl. .................................. 285/14; 123/198 D;
123/469; 285/158; 285/334.5
[58] Field of Search ................. 285/161, 158, 14, 353,
285/348, 334.5; 123/198 D, 469, 468

[56] References Cited

U.S. PATENT DOCUMENTS

| 2,547,633 | 4/1951 | Farhat | 308/36.1 |
|---|---|---|---|
| 2,635,008 | 4/1953 | Nelson | 285/161 X |
| 3,402,703 | 9/1968 | Dickerson et al. | 123/32 |
| 3,486,775 | 12/1969 | Callahan, Jr. et al. | 285/348 |
| 3,489,435 | 1/1970 | Weber et al. | 285/13 |
| 3,512,807 | 5/1970 | Moran | 285/158 |
| 3,845,748 | 11/1974 | Eisenberg | 123/468 X |
| 4,149,568 | 4/1979 | Kuntz et al. | 138/114 |
| 4,168,838 | 9/1979 | Bowen et al. | 277/125 |
| 4,384,557 | 5/1983 | Johnson | 285/14 X |

FOREIGN PATENT DOCUMENTS

| 277005 | 5/1934 | Italy | 285/348 |
|---|---|---|---|
| 398346 | 9/1933 | United Kingdom | 285/158 |
| 1350199 | 4/1974 | United Kingdom | 285/334.5 |

Primary Examiner—Thomas F. Callaghan
Attorney, Agent, or Firm—Anthony N. Woloch

[57] ABSTRACT

A bulkhead-fluid-line connector (10) is disclosed for supporting and directly sealably connecting two fluid lines (20,22) which conduct a pressurized fluid, such as fuel, through a housing wall (16) of an internal combustion engine (18).

Unlike conventional bulkhead-fluid line adapters or unions which have a plurality of fluid supply path joints, the connector (10) requires only one fluid supply path joint by directly and sealably connecting the end portions (52,54) of the respective fluid lines (20,22) with a releasable coupler (56).

2 Claims, 3 Drawing Figures

BULKHEAD-FLUID-LINE CONNECTOR

DESCRIPTION

1. Technical Field

This invention relates generally to connectors and more particularly to connectors for sealably coupling fluid lines which conduct pressurized fluid through a bulkhead or partition.

2. Background Art

In order to join external and internal fuel supply lines passing through the wall of an engine cylinder head or valve-rocker-arm cover, it has been conventional practice to create at least two joints in the fuel supply path at that location by connecting an elongated bulkhead adapter or union between the fuel lines.

In U.S. Pat. No. 3,402,703 issued to Dickerson et al on Sept. 24, 1968 and U.S. Pat. No. 3,489,435 issued to Weber et al on Jan. 13, 1970, such an adapter has at each end a conical counterbore and an externally or internally threaded end portion. Each fuel line has a fitting or nut which tightens onto the respective threaded end portion of the adapter and forces, by means of an intermediate slideable ferrule or collar, the end of the respective fuel line against the respective conical counterbore of the adapter.

Some disadvantages of this typical bulkhead fuel line connection, having multiple joints in the fuel supply path, are that assembly of the two fuel lines through the bulkhead is relatively complex and time-consuming, and each additional joint in the fuel supply path may also present more opportunity for improper assembly and consequential high pressure fuel leakage.

Furthermore, it is desirable to minimize the amount of vibration developed in the internal and external fuel lines by securing them to the low-frequency-vibrating engine cylinder head or valve-rocker-arm cover. In U.S. Pat. No. 3,402,703, the adapter has external threads which fit a threaded opening in the bulkhead. However, such a securing means is not satisfactory where the adapter is typically made of steel and the bulkhead is made of a lighter weight yet softer material such as aluminum. In such a case, the adapter may be accidently over tightened or over torqued thereby over stressing the bulkhead or even stripping the internal threads in the bulkhead opening.

The present invention is directed to overcoming one or more of the problems as set forth above.

DISCLOSURE OF THE INVENTION

In one aspect of the present invention a bulkhead-fluid-line connector is disclosed comprising an end portion formed on a first line; another end portion formed on a second line, the end portions being sealably mateably complementarity; and means for releasably coupling the fluid line end surfaces in direct surface-to-surface sealable contact.

Conventional bulkhead-fuel-line adapters require a plurality of fuel path joints between the external and internal fuel supply lines. Such a configuration is relatively complex, time-consuming to assemble, and may present more opportunity for improper assembly and consequential high pressure fuel leakage at each of the multiple fuel path joints in the adapter.

The present invention provides a bulkhead-fluid-line connector having a single fluid path joint generally where the fluid line assembly passes through the bulkhead. The single connection is relatively easier to properly asemble and minimizes the number of potential sources of high pressure fuel leakage due to improper assembly.

BEST MODE FOR CARRYING OUT THE INVENTION

Figure 1:
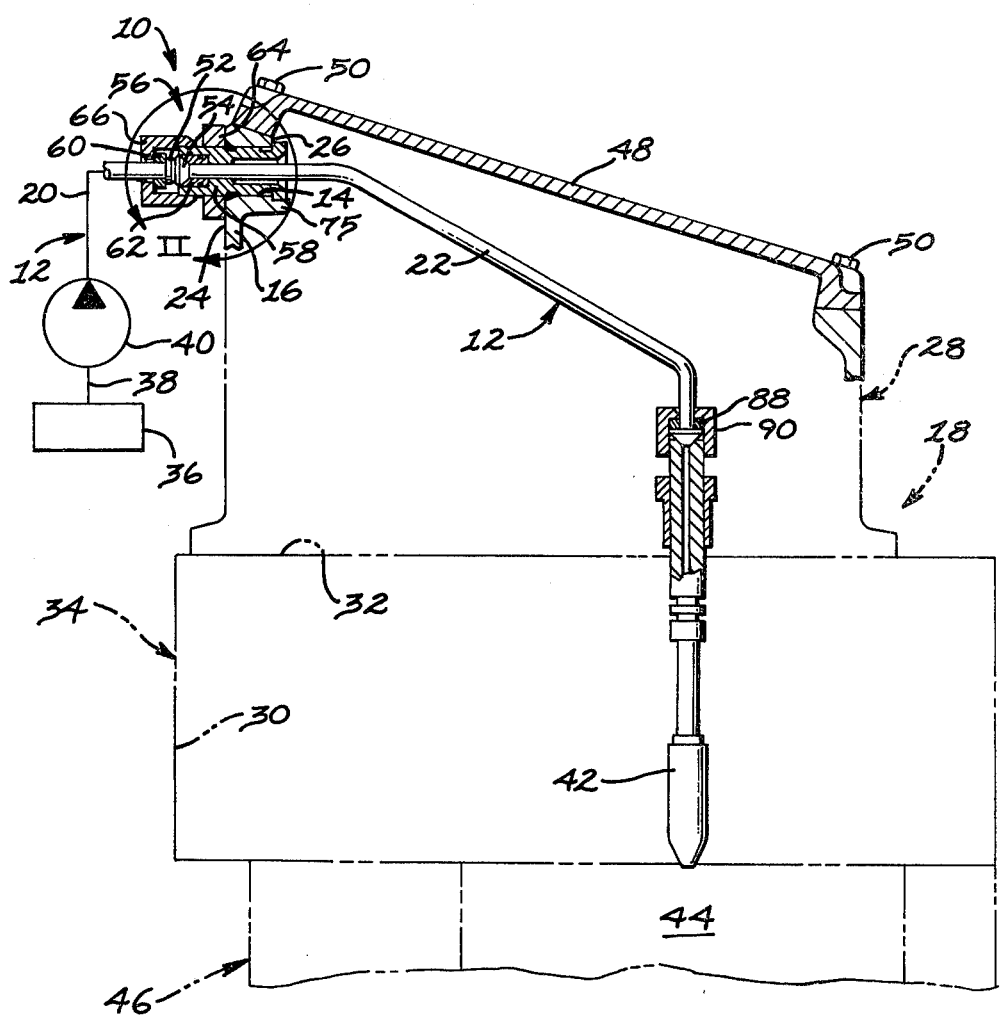
FIG. 1 is a diagrammatic cross-sectional view of the present invention as incorporated in a valve-rocker-arm cover of an internal combustion engine.
Figure 2:
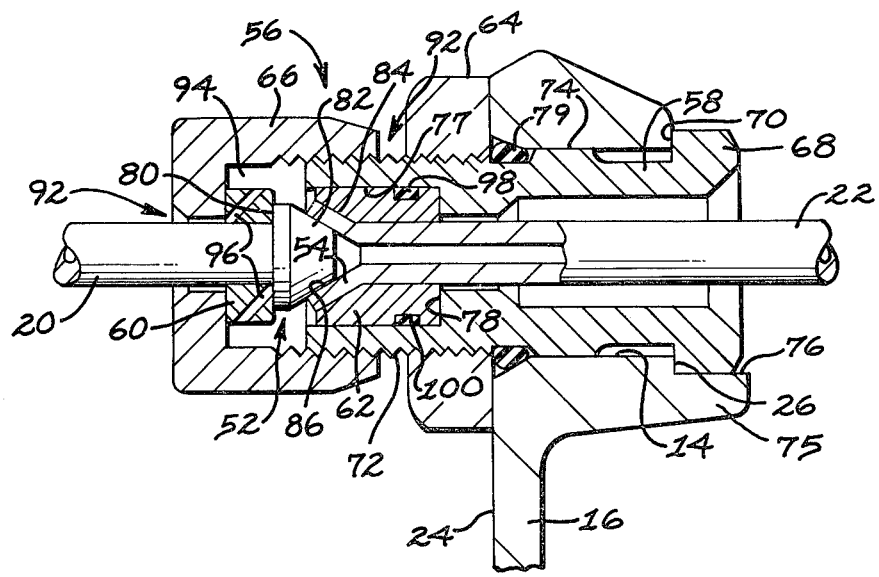
FIG. 2 is a diagrammatic enlarged partial view of FIG. 1 taken in the area indicated by circle II.
Figure 3:
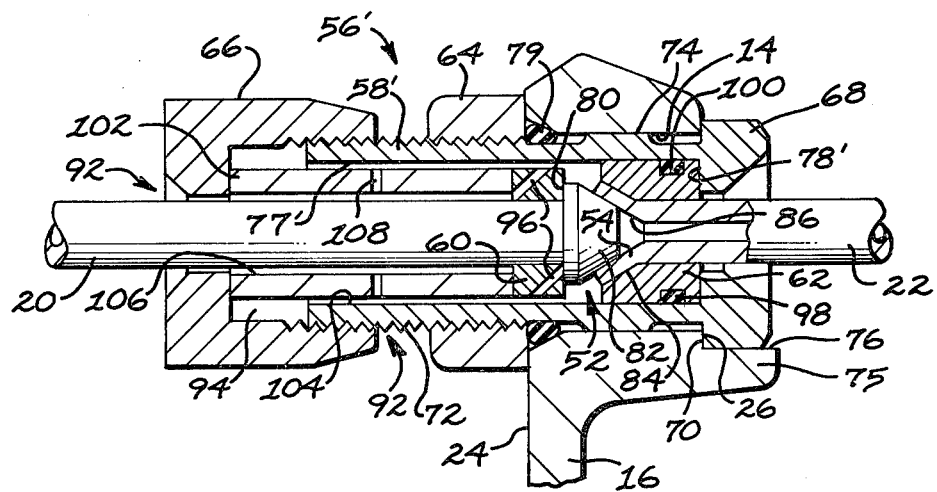
FIG. 3 is a diagrammatic view similar to FIG. 2 of an alternative embodiment of the present invention.

Referring to FIGS. 1, 2, and 3, wherein similar reference numbers designate similar components in all the views, a typical application of the bulkhead-fluid-line connector 10 is shown for joining and supporting a tubular fluid line assembly 12 which passes through a chamfered aperture 14 of a housing wall 16 associated with an internal combustion engine 18.

The tubular line assembly 12 includes an outer or first fluid line 20 and an inner or second fluid line 22 both of which are adapted to internally conduct a pressurized fluid such as fuel. The housing wall 16 has outside and inside flat parallel surfaces 24,26, and in the embodiments illustrated, forms an integral part of a valve-rocker-arm housing 28 although the connector 10, housing wall 16, and aperture 14 therethrough referred to may be located elsewhere through the engine 18 as a convenience such as angularly through a sidewall 30 and top deck 32 of a cylinder or combustion chamber head 34 shown in phantom outline.

Referring more particularly to FIG. 1, a fluid supply tank 36 is connected in series to a fluid transfer line 38, a conventional fluid-metering pump 40, the outer line 20, the inner line 22, and a conventional fluid injection nozzle 42. The fluid injection nozzle 42 is conventionally mounted within the cylinder head 34 and communicates with a combustion chamber 44 defined within an engine block 46 also shown in phantom outline. The inner fluid line 22 and a conventional valve-rocker-arm assembly (not shown) are enclosed by the valve-rocker-arm housing 28, which is shown partially in cross section and partially in phantom outline, and a housing cover 48 which is removably fastened to the housing 28 by a plurality of bolts 50.

The bulkhead-fluid-line connector 10 comprises an enlarged end portion 52 integrally formed on the outer line 20; another enlarged end portion 54 integrally formed on the inner line 22, the end portions 52,54 being sealably mateably complementarity; and means 56 for releasably coupling the fluid line end portions 52,54 in direct surface-to-surface sealable contact. Preferably, the releasable coupling means 56 is adapted to extend through the housing wall aperture 14 and to be releasably clamped against the outside and inside housing wall surfaces 24,26.

Referring to FIG. 2, the releasable coupling means 56 includes an elongated fitting 58 slideably positioned and extending through the housing wall aperture 14, first and second collars or washers 60,62, a first retainer such as an internally-threaded nut 64 releasably clamping the fitting 58 against the outside and inside housing wall surfaces 24,26, and a second retainer such as an internally-threaded cap nut 66 releasably coupling the mateably complementary end portions 52,54 of the outer and inner fluid lines 20,22 in direct surface-to-surface sealable contact.

The exterior of the fitting 58 preferably has an enlarged hexagonally shaped head-end portion 68, which is of a larger diameter than that of the housing wall aperture 14 and defines an external annular shoulder 70; another or externally-threaded end portion 72, and an intermediate annular guide portion 74 which slideably fits in the housing wall aperture 14. The interior of the fitting 58 defines a stepped longitudinal bore 77, through which the fluid line assembly 12 passes, having an internal annular shoulder 78. The external shoulder 70 of the fitting 58 abuts one of the inside or outside surfaces 26,24 of the housing wall 16 and the first retainer 64 releasably and threadably connects to the externally threaded portion 72 of the fitting 58 and abuts the other of the inside or outside surfaces 26,24 of the housing wall 16 thereby releasably securing the fitting 58 to the housing wall 16 and merely subjecting the wall to a harmless compressive stress state. In the preferred embodiment, the fitting 58 is oriented so that the fitting shoulder 70 abuts the inside housing wall surface 26. Furthermore, the inside surface 26 of the housing wall 16 is preferably provided with an integral outwardly projecting rib or lug 75 having a flat face 76. The rib 75 is oriented, for example, horizontally or, alternatively, vertically so that one of the flat sides of the hexagonal head-end portion 68 of the fitting 58 can slidably and radially abut the rib flat face 76 thereby preventing rotation of the fitting 58 within the housing wall aperture 14 as the first or second retainers 64,66 are fastened to or loosened from the fitting 58. An annular fluid seal 79 is positioned snugly on the fitting 58 between the first retainer 64 and the fitting guide portion 74. The second retainer 66 is thereafter also releasably and threadably connected to the threaded end portion 72 of the fitting 58.

Preferably, the enlarged end portion 52 of the outer line 20 is cold formed by a tube swaging operation and has an annular shoulder 80 and an external end surface 82 which is frusto-conically shaped to an included angle of about 60°. Similarly, the another enlarged end portion 54 of the second line 22 is cold formed by a tube swaging operation and has an external annular frustoconical shoulder 84 and a frusto-conical internal end surface 86 which is sealably, mateably complementarity with respect to the end surface 82 of the outer line 20.

Preferably prior to the tube swaging operation, the first and second collars 60,62 are slideably positioned adjacent the nonenlarged end portions 52,54 of the respective outer and inner fluid lines 20,22 so that the collars 60,62 become pressed onto the respective lines 20,22 by an interference fit during the tube swaging operation. As shown in FIG. 1, the inner line 22 is similarly provided with a third collar or washer 88 and a slideable third retainer or cap nut 90 before the inner line is swaged at its opposite end portion. Furthermore, the releasable coupling means 56 preferably includes at least one fluid leakage path 92 extending adjacent the joint of the contacting fluid line end surfaces 82,86 and leading to the outside of the second retainer 66. The fluid leakage path 92 includes a cavity 94, defined by the inside of the second retainer 66 and one or more angularly drilled passages 96 located in the first collar 60. Two parallel and spaced apart passages 96 are preferably provided as shown to ensure that one of the passages 96 will always communicate with the cavity 94 regardless of which side of the first collar 60 abuts the annular shoulder 80 of the first line 20 during assembly. Another annular fluid seal 98 is positioned in a radially peripheral annular groove 100 of the second collar 62. The two annular seals 79,98 tightly seal the fluid leakage path 92 from the inside surface 26 of the housing wall 14 and, consequently in the embodiments illustrated, seal the fluid leakage path 92 from the inside of the valve-rocker-arm housing 28.

FIG. 3 illustrates an alternative embodiment of the present invention which basically differs from that shown in FIGS. 1 and 2 in that the internal shoulder 78' of the fitting bore 77' is positioned closer to the head-end portion 68 of the fitting 58'. The releasable coupling means 56' further includes an elongated sleeve 102 positioned concentrically, between the first line 20 and the fitting 58', and transversely slideably positioned between the first collar 60 and the second retainer 66. A first annular clearance 104 is provided concentrically between the sleeve 102 and the fitting 58' and a second annular clearance 106 is provided between the sleeve 102 and the first line 20. The releasable coupling means 56' shown in FIG. 3 effectively shortens the required overall length of the inner line 22 in order to facilitate easier installation and removal of the inner line within the housing 28. In FIG. 3 instead of providing the passage or passages 96 in the first collar 60, alternatively, the sleeve 102 may, for example, be provided with a cross hole 108 drilled through its middle portion or a notch (not shown) at either end of the sleeve 102.

INDUSTRIAL APPLICABILITY

While the assembly and operation of the present invention is believed clearly apparent from the foregoing description, further amplification will be made in the following brief summary of such assembly and operation.

To assemble the fluid line assembly 12 through the housing wall 16, an unbent and nonswaged inner line 22 is slideably passed through the second collar 62 and bore 77 of the fitting 58. With the fitting 58 temporarily slideably positioned out of the way, the second collar 62 is slideably positioned adjacent the end portion 54 of the inner line 22 and then the end portion 54 is enlarged by swaging to form the internal frusto-conical surface 86, external shoulder 84, and an interference fit between the second collar 62 and the inner line 22. The opposite end portion of the inner line 22 may at the same time be provided with the third retainer 90, which is temporarily remotely slideably spaced while the opposite end portion is swaged, and the third collar 88 which is press-fitted thereon. The second line may then be bent to a preselected shape in order to fit within the housing 28 and connect between the releasable coupling means 56 and the fluid injection nozzle 42.

The annular seal 98 is positioned in the groove 100 of the second collar 62 and the second collar 62 is then snugly positioned in the fitting bore 77 against the internal shoulder 78 of the fitting 58.

With the housing cover 48 removed from the housing 28, the inner line 22 and the components 58,62,88,90,98 assembled to or trapped on it are positioned in the housing 28 and the fitting 58 is slideably positioned through the housing wall aperture 14 until one of the sides of the hexagonal head-end portion 68 radially abuts the flat face 76 of the housing wall rib 75, the external shoulder 70 abuts the inside surface 26 of the housing wall 16, and the externally threaded portion 72 of the fitting 58 projects outwardly from the outside surface 24 of the housing wall 16. The annular seal 79 is then positioned on the exterior of the fitting 58 between the threaded end portion 72 and the guide portion 74. The first retainer 64 is then loosely threadably fastened to the fitting threaded end portion 72. The third retainer 90 is then threadably fastened to the fuel injection nozzle 42. At this point the first retainer 64 may be threadably tightened thereby clamping the fitting 58 against the outside and inside housing wall surfaces 24,26 and subjecting the housing wall 16 to a harmless compressive stress state between the first retainer 64 and the head-end portion 68 of the fitting 58. This ensures that the fluid line assembly 12 may be supported and secured to a low frequency vibrating structure such as the valve-rocker-arm housing 28 without adversely stressing or cracking the housing. The outer line 20 is then positioned so that the end surfaces 82,86 are in direct sealable mating contact and the second retainer 66 is threadably tightened onto the threaded end portion 72 of the fitting 58 so that the end surfaces 82,86 seal against each other. The bulkhead-fluid-line connector 10 having a single fluid path joint is relatively easier and less time consuming to assemble and service as compared with adapters having multiple fluid path joints and thereby minimizes the number of potential sources of high pressure fuel leakage due to improper assembly.

In operation a fluid, such as fuel, is delivered from the fluid supply tank 36, through the fluid transfer line 38, and then through pump 40 where the fluid is periodically metered and delivered under high pressure through outer line 20, through inner line 22, through fluid injection nozzle 42 and sprayed into the engine combustion chamber 44.

In the event that the second retainer 66 is not properly tightened, high pressure fluid leaking between the end surfaces 82,86 of the single fluid path connection will be prevented by the seals 79,98 from entering the housing 28 and contaminating or diluting a lubricating fluid which is normally circulated therein. In FIG. 2 any fluid leakage may flow into the second retainer cavity 94 and out to the exterior of the second retainer 66 via either one of the angularly drilled passages 96 in the first collar 60 or along the threaded end portion 72 of the fitting 58. In FIG. 3, any fluid leakage will flow out to the exterior of the second retainer 66 either via one of the collar passages 96 and second annular clearance 106 or along the first annular clearance 104 and past the threaded end portion 72 of the fitting 58'.

While the invention has been described and shown with particular reference to the preferred embodiments, it is apparent that variations are possible that would fall within the scope of the present invention which is not intended to be limited, except as defined in the following claims.

I claim:

1. A bulkhead-fluid-line connector (10) for joining and supporting a tubular fluid line assembly (12) adapted for passing through an aperature (14) of a housing wall (16), said housing wall (16) having outside and inside surfaces (24,26), said fluid line assembly (12) including first and second fluid lines (20,22), said bulkhead-fluid-line connector (10) comprising:

an enlarged end portion (52) integrally formed on the first line (20) and having an externally disposed and frusto-conically shaped end surface (82);

another enlarged end portion (54) integrally formed on the second line (22) and having an internally disposed and frusto-conically shaped end surface (86) which is sealedly matedly complementarity with respect to said end surface (82) of the first line (20); and means (56) for releasably coupling said complementary end surfaces (82,86) of the fluid line end portions (52,54) in direct surface-to-surface sealed contact and thereby solely creating a single fluid path joint between the first and second fluid lines (20,22) generally where the fluid line assembly (12) is adapted to pass through the housing wall aperature (14), wherein said releasable coupling means (56) includes a fluid leakage path (92) extending adjacent the single joint of the sealedly contacting fluid line end surfaces (82,86) and adapted to be sealed from said inside surface (26) of the housing wall (16) and further adapted to lead only to the outside of said housing wall (16) said releasable coupling means (56) further includes a fitting (58), first and second retainers (64,66), and first and second collars (60,62), said fitting (58) adapted to slidably extend through said housing wall aperature (14) and defining a stepped longitudinal bore (77) having an internal shoulder (78) through which the fluid line assembly (12) passes, said fitting (58) having an enlarged head end portion (68) defining an external shoulder (70) and another end portion (72), said fitting shoulder (70) adapted to abut one of said inside or outside housing wall surfaces (26,24), said first retainer (64) releasably connected to said another end portion (72) of the fitting (58) and adapted to abut said other of the inside or outside housing wall surfaces (26,24), said second retainer (66) also releasably connected to said another end portion (72) of the fitting (58) and releasably coupling said complementary end surfaces (82,86) of the fluid line end portions (52,54) in direct surface-to-surface sealed contact, said second collar (62) sealedly positioned in said fitting bore (77) against said internal shoulder (78) of the fitting (58) and abutting said second line another end portion (54), said first collar (60) positioned between said first line end portion (52) and said second retainer (66).

2. The bulkhead-fluid-line connector (10) as in claim 1 wherein said fluid leakage path (92) includes a cavity (94), defined by the inside of the second retainer (66), and at least one passage (96) located in the first collar (60) which communicates the cavity (94) with the external surface of said second retainer (66).

* * * * *